US009474027B2

(12) United States Patent
Prociw et al.

(10) Patent No.: US 9,474,027 B2
(45) Date of Patent: Oct. 18, 2016

(54) SYSTEM AND METHOD OF EXTENDING USEFUL LIFE OF POWER SUPPLY

(71) Applicant: BLACKBERRY LIMITED, Waterloo (CA)

(72) Inventors: Philip James Prociw, Waterloo (CA); Chee-Ming Jimmy Wu, Waterloo (CA); Yu William Feng, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 200 days.

(21) Appl. No.: 14/089,024

(22) Filed: Nov. 25, 2013

(65) Prior Publication Data
US 2015/0148094 A1    May 28, 2015

(51) Int. Cl.
| H04M 1/00 | (2006.01) |
| H04W 52/02 | (2009.01) |
| G06F 1/28 | (2006.01) |
| H01M 10/615 | (2014.01) |
| H04W 4/00 | (2009.01) |
| H01M 10/48 | (2006.01) |
| H01M 10/623 | (2014.01) |
| H04W 88/06 | (2009.01) |

(52) U.S. Cl.
CPC ............ *H04W 52/0251* (2013.01); *G06F 1/28* (2013.01); *H01M 10/486* (2013.01); *H01M 10/615* (2015.04); *H01M 10/623* (2015.04); *H04W 4/008* (2013.01); *H04W 88/06* (2013.01)

(58) Field of Classification Search
None
See application file for complete search history.

(56) References Cited

U.S. PATENT DOCUMENTS

| 2007/0057851 A1* | 3/2007 | Leizerovich | H01Q 1/44 343/702 |
| 2009/0102290 A1* | 4/2009 | Wolf | H02J 7/0029 307/80 |
| 2009/0315789 A1* | 12/2009 | Sung et al. | H01Q 1/243 343/702 |
| 2010/0213842 A1* | 8/2010 | Geris | G03B 15/05 315/33 |

FOREIGN PATENT DOCUMENTS

| CA | 2538817 C | * | 5/2010 | .......... H01M 10/615 |
| DE | 102011108196 A1 | | 1/2013 | |
| WO | 0189055 A1 | | 11/2001 | |
| WO | 2009053858 A2 | | 4/2009 | |
| WO | 2013013781 A1 | | 1/2013 | |

OTHER PUBLICATIONS

European Extended Search Report; Application No. 14194817.4; Apr. 7, 2015; 8 pages.

* cited by examiner

*Primary Examiner* — Mohammed Rachedine
(74) *Attorney, Agent, or Firm* — Conley Rose, P.C.; J. Robert Brown, Jr.

(57) ABSTRACT

A method of internally heating a power supply of an electronic device in reduced temperatures is provided. The method comprises positioning an antenna of the electronic device proximate to the power supply and receiving a "temperature" signal that is a function of a temperature of the power supply. When it is determined that the temperature is within a reduced operating-temperature range, the temperature is elevated and the equivalent series resistance (ESR) of the power supply is correspondingly reduced by actively sending current through the antenna. The "current sending" operation is reduced when the temperature of the portable electronic device is outside the reduced operating-temperature range.

19 Claims, 4 Drawing Sheets

SYSTEM AND METHOD OF EXTENDING USEFUL LIFE OF POWER SUPPLY

BACKGROUND

A portable electronic device (PED) can be powered by an internal power supply (e.g., a chemical battery or otherwise) such that the PED can perform its capabilities for a useful life of the PED or power supply. A length of such useful life can be affected by a temperature of the power supply.

For example, a mobile wireless communications device—such as a cellular mobile telephone—is typically powered by a single battery (or battery pack) and capable of calling, e-mailing, texting, etc. Current drawn from the battery during operation of the device drops voltage of the battery and, in turn, drains its useful life, possibly even to a level causing the device to shut down. The voltage level and, thus, useful life of the battery is dependent upon its temperature [among other factors (such as age of the battery)]. More specifically, equivalent series resistance (ESR) of the battery varies inversely with the temperature. For example, as the battery temperature rises, the ESR falls, which increases the battery's voltage level and, thereby, useful life. In contrast, as the battery temperature falls, the ESR rises, which decreases the battery's voltage level and, thereby, useful life. In this way, performance of the battery and, hence, device are dependent upon the battery temperature.

Such a dependence becomes a concern especially when an environment in which the device is to be used is relatively cold (for instance, in geographical areas that experience relatively cold climates). The colder environment generally results in a shorter useful life of the device. This can be a concern in a situation in which it is impossible to place a call or send an e-mail or text message using the device before it shuts down.

Accordingly, there is a need to lengthen the useful life of a PED powered by an internal power supply. More specifically, there is a need to lengthen the useful life of a battery of a mobile wireless communications device, especially in lower- or reduced-temperature environments.

BRIEF DESCRIPTION OF DRAWING

For a more complete understanding of this disclosure, reference is now made to the following detailed description taken in connection with the accompanying drawing, wherein like reference numerals represent like parts.

DETAILED DESCRIPTION

It should be understood at the outset that although illustrative implementations of at least one embodiment of the present disclosure are provided below, the disclosed systems and/or methods may be implemented using any number of techniques, whether currently known or in existence. The disclosure should in no way be limited to the illustrative implementations, drawing, and techniques illustrated below, including the exemplary designs and implementations illustrated and described herein, but may be modified within the scope of the appended claims along with their full scope of equivalents.

Figure 1:
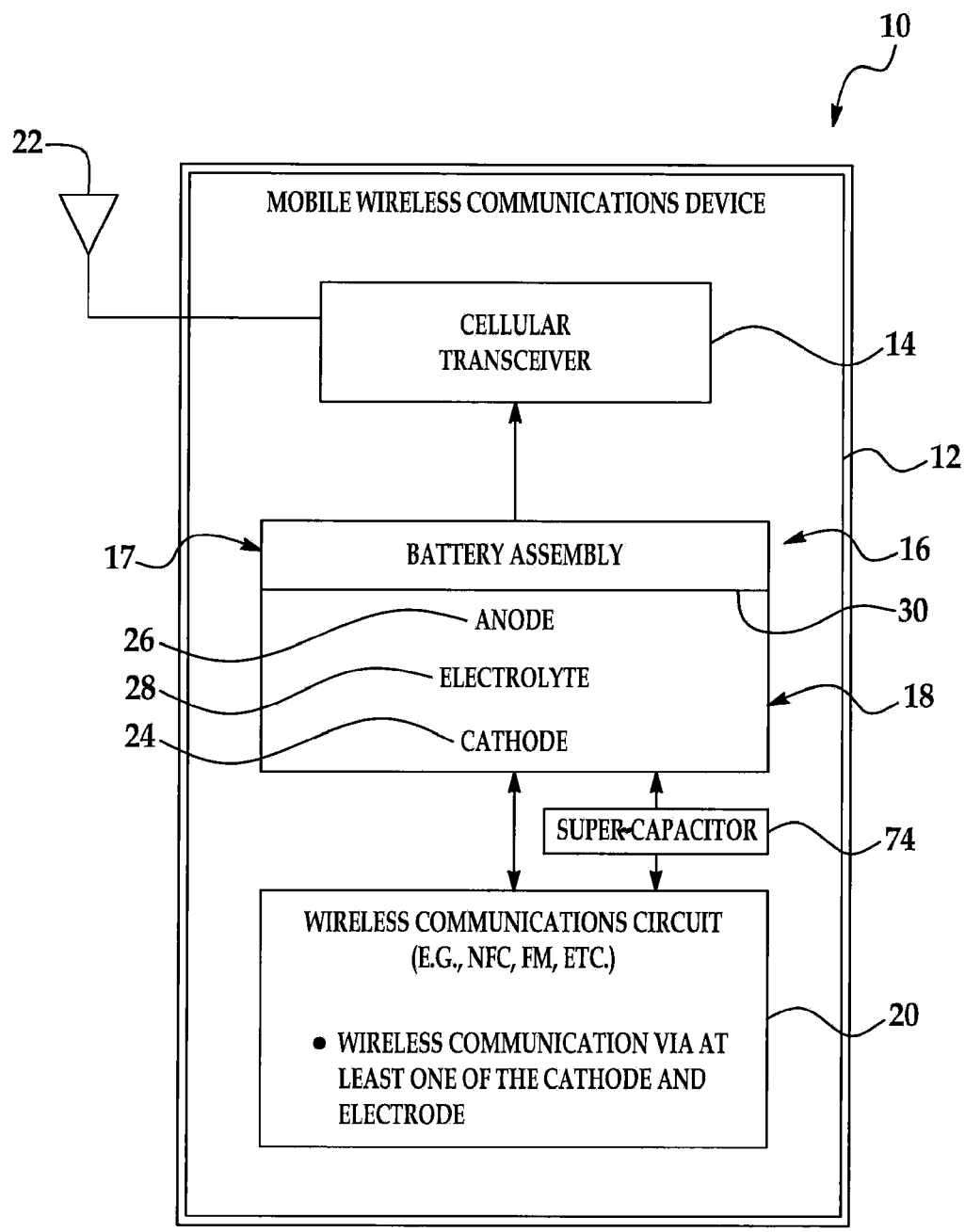
FIG. 1 is a schematic block diagram of a portable electronic device (PED) showing a power supply and antenna of the PED according to an embodiment.
Figure 2:
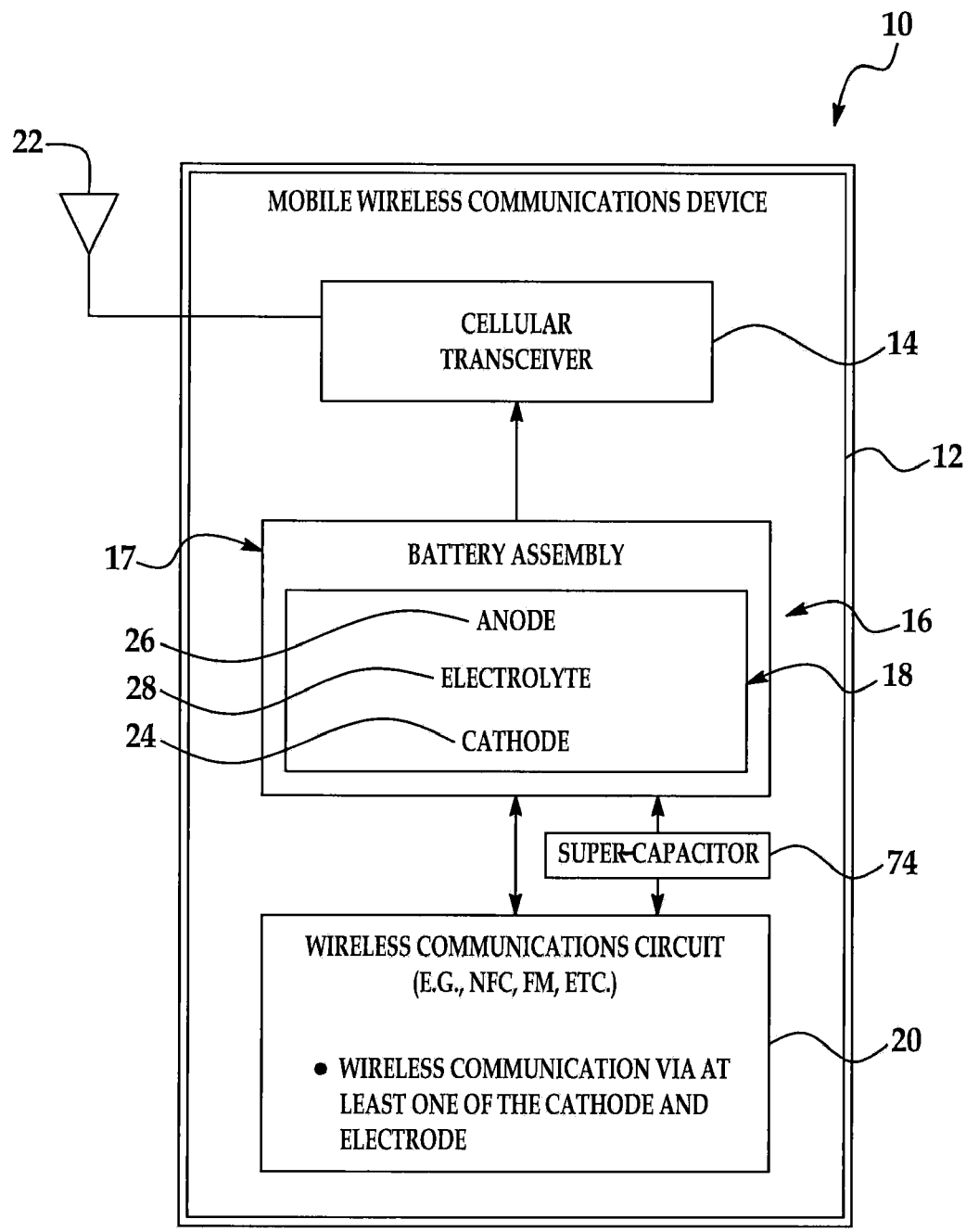
FIG. 2 is a schematic block diagram of the PED of FIG. 1 showing the power supply according to another embodiment.

Referring initially to FIGS. 1 and 2, a portable electronic device (PED), generally indicated at 10, illustratively includes a portable housing, generally indicated at 12, carrying a cellular transceiver 14, a power supply, generally indicated at 16, a housing, generally indicated at 17, for the power supply 16, an antenna, generally indicated at 18, positioned proximate to (including at) the power supply 16, and a wireless communications circuit 20 configured to wirelessly communicate via the antenna 18. The portable housing 12 may carry also at least one cellular antenna 22 (e.g., an internal or external antenna) coupled to the cellular transceiver 14.

In the embodiment shown, the power supply 16 is a battery or cell (e.g., rechargeable lithium-polymer battery or cell) or battery pack or assembly 16. However, it should be appreciated that the power supply 16 can be any suitable power supply (chemical or otherwise). It should be appreciated also that the battery assembly 16 may include any battery assembly that has at least one energy-storage element. It should be appreciated also that, although the battery assembly 16 stores energy chemically, such chemistry is not necessarily limited to a particular type. It should be appreciated also that the battery assembly 16 may not include the housing 17.

Also in the embodiment shown, the PED 10 is a mobile wireless communications device 10. However, it should be appreciated that the PED 10 can include (but is not limited to) wireless personal digital assistants (PDAs), cellular telephones, smart telephones, electronic messaging devices, and laptop computers.

In an embodiment, the antenna 18 includes a pair of electrodes (namely, a cathode 24 and an anode 26) and an electrolyte 28 positioned between the cathode 24 and anode 26. The wireless communications circuit 20 is configured to operate via magnetic-field induction, such as a near-field-communication (NFC) circuit that generates a magnetic field in an active mode to send and receive NFC signals using at least one of the cathode 24 and anode 26. In another embodiment, the wireless communications circuit 20 includes a frequency-modulation (FM) circuit configured to receive FM signals via at least one of the cathode 24 and anode 26. In this way, the antenna 18 may function as a radio-frequency-identification (RFID) (e.g., low-frequency NFC) or radio-frequency (RF) (e.g., FM) antenna or both.

As stated above, the antenna 18 is positioned proximate to the battery 16. Toward this end, in an embodiment and as shown in FIG. 1, the antenna 18 is fixed to the battery assembly 16. More specifically, the battery assembly can include a door 30, and the antenna 18 can be fixed to the door 30. In another embodiment and as shown in FIG. 2, the battery assembly 16 or a component thereof may not be removed from the PED 10 and is, therefore, a non-removable battery (NRB) or embedded battery, and the antenna 18 is integrated with the battery assembly 16. In any event, the battery assembly 16 and antenna 18 are positioned proximate with respect to each other such that the battery assembly 16 and antenna 18 occupy substantially a same volume or space.

It should be appreciated that the antenna 18 can be any suitable type of antenna. It should be appreciated also that the battery assembly 16 and antenna 18 can have any suitable physical relationship with each other such that the battery assembly 16 and antenna 18 are positioned at least sufficiently proximate with respect to each other. It should be appreciated also that the battery assembly 16 or a component thereof may be removed from the PED 10.

For the most part, the antenna 18 is idle unless and until the PED 10 uses the antenna 18 during a transaction or exchange of data (placement of a call or sending of an e-mail or text message) by the PED 10. All the while, however, the PED 10 can be set in various "temperature" environments such that the PED 10 can undergo respective various "temperature" conditions, including relatively cold ones. As discussed in further detail below, the antenna 18 functions or doubles as a heater for the battery assembly 16 under certain conditions to advantageously extend a useful life of the battery assembly 16.

The concepts described in further detail below may be applied with a variety of devices, and the concepts are not restricted to application with the illustrative PED 10. The PED 10 includes data-communication capabilities and may communicate with other electronic devices directly or through a wireless network. The PED 10 is based upon a computing environment and functionality of a handheld computer (i.e., sized and shaped to be held and carried by a human hand and typically used while so held and carried).

Figure 3:
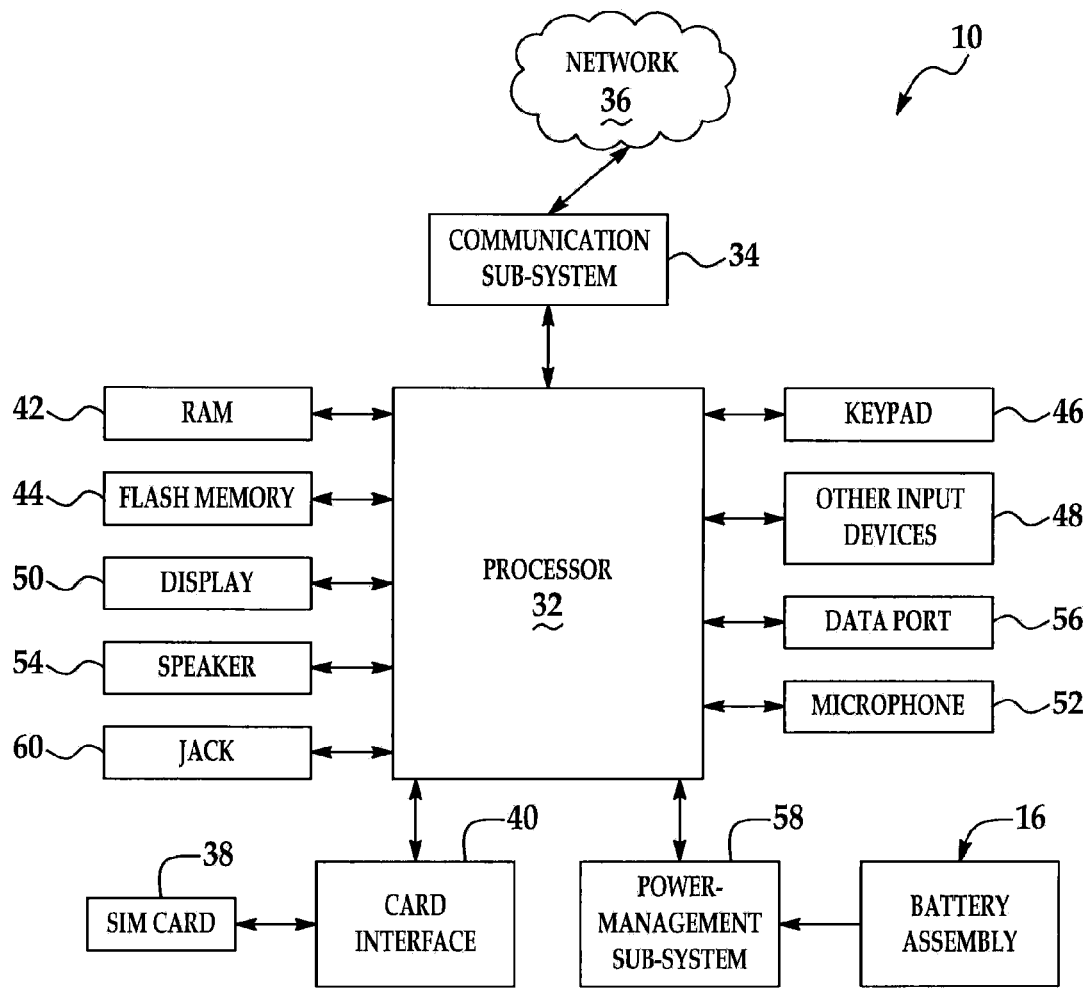
FIG. 3 is a block diagram of the PED of FIG. 1 according to an embodiment.

In FIG. 3, the PED 10 includes several components, including a processor 32, which controls overall operation of the PED 10. Although depicted for simplicity as a single unit, the processor 32 can be embodied as a plurality of processors 32, each processor 32 controlling (or participating in control of) at least one operation of the PED 10. A communication sub-system 34 controls data and voice-communication functions—such as calling, e-mailing, and texting functions. The communication sub-system 34 is in communication with a wireless network 36, which may be a data-centric wireless network, a voice-centric wireless network, or a dual-mode wireless network.

The communication sub-system 34 is a dual-mode wireless network that supports both voice and data communications. The communication sub-system 34 is configured in accordance with the "Global System for Mobile Communication" (GSMC) and "General Packet Radio Services" (GPRS) standards. The communication sub-system 34 may be configured alternatively in accordance with "Enhanced Data GSM Environment" (EDGE) or "Universal Mobile Telecommunications Service" (UMTS) standards. Other wireless networks may also be associated with the PED 10, including "Code Division Multiple Access" (CDMA) or "CDMA2000" networks. Examples of data-centric networks include "WiFi 802.11," "Mobitex™" and "DataTAC™" communication systems. Examples of voice-centric networks include "Personal Communication Systems (PCS)" networks like "GSM" and "Time Division Multiple Access (TDMA)" communication systems.

The wireless network 36 includes base stations (not shown) that provide a wireless link to the PED 10. Each base station defines a cell that, in turn, defines a coverage area within which communications between the base station and PED 10 can be effected. It should be appreciated that the PED 10 is movable within the cell and can be moved to respective coverage areas defined by other cells. Data is delivered to the PED 10 via wireless transmission from the base station. Similarly, data is sent from the PED 10 via wireless transmission to the base station.

The communication sub-system 34 further includes a "short-range communications" function, which enables the device 10 to communicate directly with other devices and computer systems without use of the wireless network 36 through, for example, infrared or "Bluetooth™" technology.

Prior to the PED 10 being able to send and receive communication signals over the wireless network 36, network registration or activation procedures must have been completed. To enable network communication, a "SIM (Subscriber Identity Module)" card 38 is inserted into a card interface 40. The "SIM" card (or "Removable User Identity Module" card) 38 is used to identify a user of the PED 10, store personal device settings, and enable access to network services (such as e-mail and voicemail) and is not bound to a particular PED 10.

The processor 32 is also connected to a random-access memory (RAM) 42 and flash memory 44. An operating system and a device software are typically stored in the flash memory 44 and executable by the processor 32. Some components of the device software may, in turn, be stored in the RAM 42. The PED 10 includes computer-executable programmed instructions for directing the PED 10 to implement various applications. Some examples of applications that may be stored on and executed by the PED 10 include electronic messaging, games, a calendar, an address book, and a music player. Software applications that control basic operation of the PED 10, such as voice and data communication, are typically installed during manufacture of the PED 10. For a PED 10 that does not include a "SIM" card 38, user-identification information may be programmed into the flash memory 44. The flash memory 44 may alternatively be a persistent storage, a read-only memory (ROM), or other non-volatile storage.

The processor 32 receives input from a keypad 46 and other various input devices 48. The keypad 46 may be completely alphanumeric or of a "telephone" type. The other input devices 48 may replace or complement the keypad 46 to facilitate input and include devices such as single or multi-function buttons and a touch screen, mouse, trackball, capacitive touch sensor, or roller wheel with dynamic button-pressing capability. The PED 10 of FIG. 3 is shown by way of example, and it should be appreciated that many different types, shapes, and input-device configurations of the PED 10 are possible.

The processor 32 outputs to various output devices, such as a display 50. In an embodiment, the display 50 is an LCD screen 50. A microphone 52 and speaker 54 are connected to the processor 32 for cellular-telephone functions. A data port 56 is connected to the processor 32 for enabling data communication between the PED 10 and another computing device. The data port 56 may include data lines for data transfer and a supply line for charging the battery assembly 16 of the PED 10. A power-management sub-system 58 may be electrically coupled to the battery assembly 16 and provide an interface between an auxiliary charging device and the battery assembly 16. The power-management sub-system 58 may perform any of several functions pertaining to power management, including controlling recharging of the battery assembly 16 or regulating power delivery to other components in the PED 10. Some of these functions 58 are discussed below.

The PED 10 is operable in "data communication" and "voice communication" modes. In the "data communication" mode, a received data signal representing information (such as a text message, an e-mail message, a media file to be transferred, or a webpage download) is processed by the communication sub-system 34 and input to the processor 32. The processor 32 further processes the signal and renders images for display on the display screen 50. Alternatively, the processed signals may be output to another computing device through the data port 56. To transmit information in the "data communication" mode, the user of the PED 10 composes information for transmission (such as e-mail messages) using the keypad 46 and other input devices 48 in conjunction with the display screen 50. The composed information is transmitted through the communication sub-system 34 over the wireless network 36 or via short-range communications. Operation of the PED 10 in the "voice communication" mode is similar to that of the "data communication" mode except that the received signals are output to the speaker 54 or an auxiliary device (such as a headset or headphones) and signals for transmission are generated by the microphone 52. The PED 10 may also include other voice sub-systems, such as a voice-message-recording sub-system. An audio jack 60 is provided for receiving an audio accessory, such as headphones, a headset, or amplified speakers or headphones. The audio jack 60 may also receive other accessories, such as a multi-media accessory including "Play," "Pause," "Stop," and "Rewind" buttons or a "TV Out" accessory that allows for connection of the PED 10 to a television.

Only a limited number of sub-systems of the PED 10 has been described. It should be appreciated that additional sub-systems corresponding to additional features of the PED 10 may also be connected to the processor 32.

Figure 4:
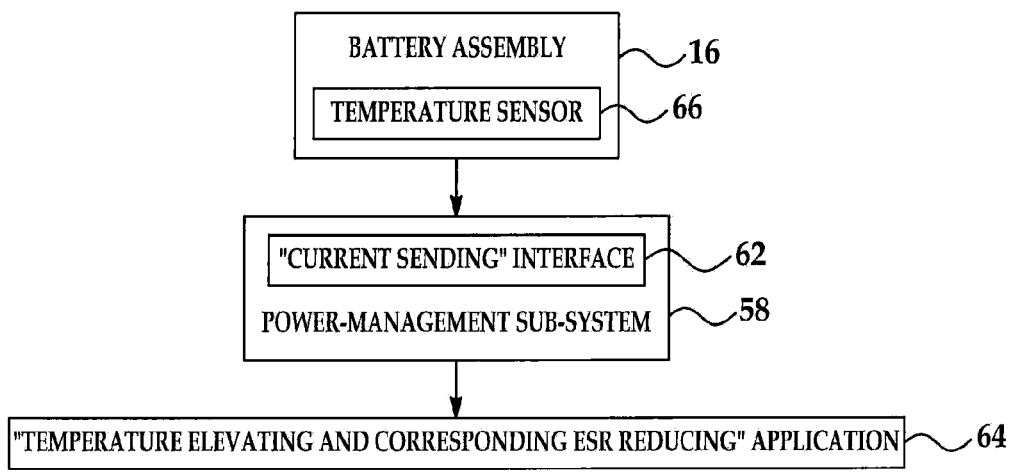
FIG. 4 is a block diagram of the power supply of the PED of FIG. 1 according to an embodiment.

Referring to FIG. 4, the power-management sub-system 58, which regulates and distributes power throughout the PED 10, includes a "current sending" interface 62 for communicating with the battery assembly 16. The power-management sub-system 58 may operate under direction of the processor 32. In a typical implementation, the power-management sub-system 58 includes at least one integrated circuit. The power-management sub-system 58 may operate under the control of the processor 32 when the processor 32 executes a "temperature elevating and corresponding ESR reducing" application 64, which is stored on the PED 10 (e.g., in the flash memory 44) and executable by the processor 32. [Equivalent series resistance (ESR) of the battery assembly 16 varies inversely with the temperature.]

A temperature sensor 66 is coupled to the battery assembly 16 to sense a temperature of the battery assembly 16. For simplicity, a single temperature sensor 66 is depicted in FIG. 4, but the concept may be adapted to a plurality of temperature sensors 66. As used herein, "couple" refers to a physical relation of two components with each other such that a condition of one component affects function of the other. In the case of the temperature sensor 66 and battery assembly 16, the components may be physically coupled to each other in that they are proximate to one another such that the temperature sensor 66 can sense a temperature of the battery assembly 16. The temperature sensor 66 may be physically close to the battery assembly 16, abutting the battery assembly 16, or a component of the battery assembly 16 (such as affixed to or embedded in the housing 17 of the battery assembly 16). The temperature sensor 66 may be electrically coupled to components (for example, the temperature sensor 44 may be electrically coupled to the processor 32 by supplying or providing a "temperature" indication in the form of an electrical signal, which is received by the processor 32).

As used herein, "electrical coupling" refers to a relation of two components with each other such that one component can communicate with the other by way of an electrical signal. The electrical signal may be an essentially continuous signal (such as a modulated voltage or current signal) or discrete signal (such as an "on/off" or "high/low" voltage or current signal). The electrical signal may also include delivery of power. Two components may be electrically coupled to one another even if they are not connected directly to one another and even if the electrical signal passes through at least one intermediary element. The temperature sensor 66 may be coupled electrically to the processor 32 without necessarily being physically close to or abutting the processor 32.

The temperature sensor 66 senses a temperature of the battery assembly 16 by receiving as input a sensed temperature of the battery assembly 16 and issuing as output a "temperature" signal. The "temperature" signal is generally a function of the temperature of the battery assembly 16. The "temperature" signal may (but need not) be an electrical signal that changes as a function of the sensed temperature of the battery assembly 16. In some embodiments, there may be a range of "temperature" signals. In other embodiments, the "temperature" signal may be a simple logical signal that, for example, goes low when the sensed temperature is in a low or a reduced operating-temperature range and otherwise high. The "temperature" signal may then be provided to the processor 32, which determines whether the temperature is within the reduced operating-temperature range as a function of the "temperature" signal. As discussed below, this determination may affect the "temperature elevating and corresponding ESR reducing" application 64, which may control the power-management sub-system 58.

In one embodiment, the temperature sensor 66 is a thermistor. Other suitable temperature sensors 66 may alternatively be used (for example, a thermocouple or CMOS on-chip temperature sensor). The temperature sensor 66 may be deployed anywhere on, in, or proximate to the battery assembly 16 (including, but not limited to, places in the battery assembly 16 that tend to be hotter or cooler than other places during use or recharging of the PED 10). In some embodiments, the temperature sensor 66 may be a component of the battery assembly 16 such that removal of the battery assembly 16 or a component thereof disengages the temperature sensor 66 from the PED 10. In other embodiments, the temperature sensor 66 remains coupled to other components in the PED 10. In other words, the temperature sensor 66 may be coupled to a non-removable component of the PED 10 (including, but not limited to, a non-removable component of the battery assembly 16 such that removal of the battery assembly 16 or a component thereof does not disengage the temperature sensor 66 from the PED 10).

Temperature elevating and corresponding ESR reducing of the battery assembly 16 may be performed at normal and reduced operating temperatures of the battery assembly 16. In particular, the power-management sub-system 58 may elevate the temperature and correspondingly reduce the ESR of the battery assembly 16 when the battery assembly 16 is below the normal operating temperature and within a reduced operating-temperature range. In a typical implementation, for example, the temperature of a battery of the battery assembly 16 may be elevated and the ESR thereof may be correspondingly reduced substantially continuously until a desired or predetermined level of useful life of the battery assembly 16 is reached. At any point, such elevation and corresponding reduction may be stopped.

It should be appreciated that the power-management sub-system 58 can still allow the temperature of the battery assembly 16 to fall when the battery assembly 16 is below the normal operating temperature and within the reduced operating-temperature range.

What constitutes a "reduced operating" may be defined differently for different circumstances. Stated another way, what constitutes a reduced operating temperature for one battery assembly 16 might not constitute a reduced operating temperature for another battery assembly 16. A reduced operating-temperature range may be defined as 0° C. and lower (32° F. and lower). A range of reduced temperatures may also be defined that are extra-reduced. For example, an extra-reduced temperature range may be defined as −18° C. and lower (0° F. and lower). Control of temperature elevation and corresponding ESR reduction may be changed if sensed temperatures reach the extra-reduced temperature range. Heating may be terminated entirely when sensed temperatures reach the extra-reduced temperature range.

Figure 5:
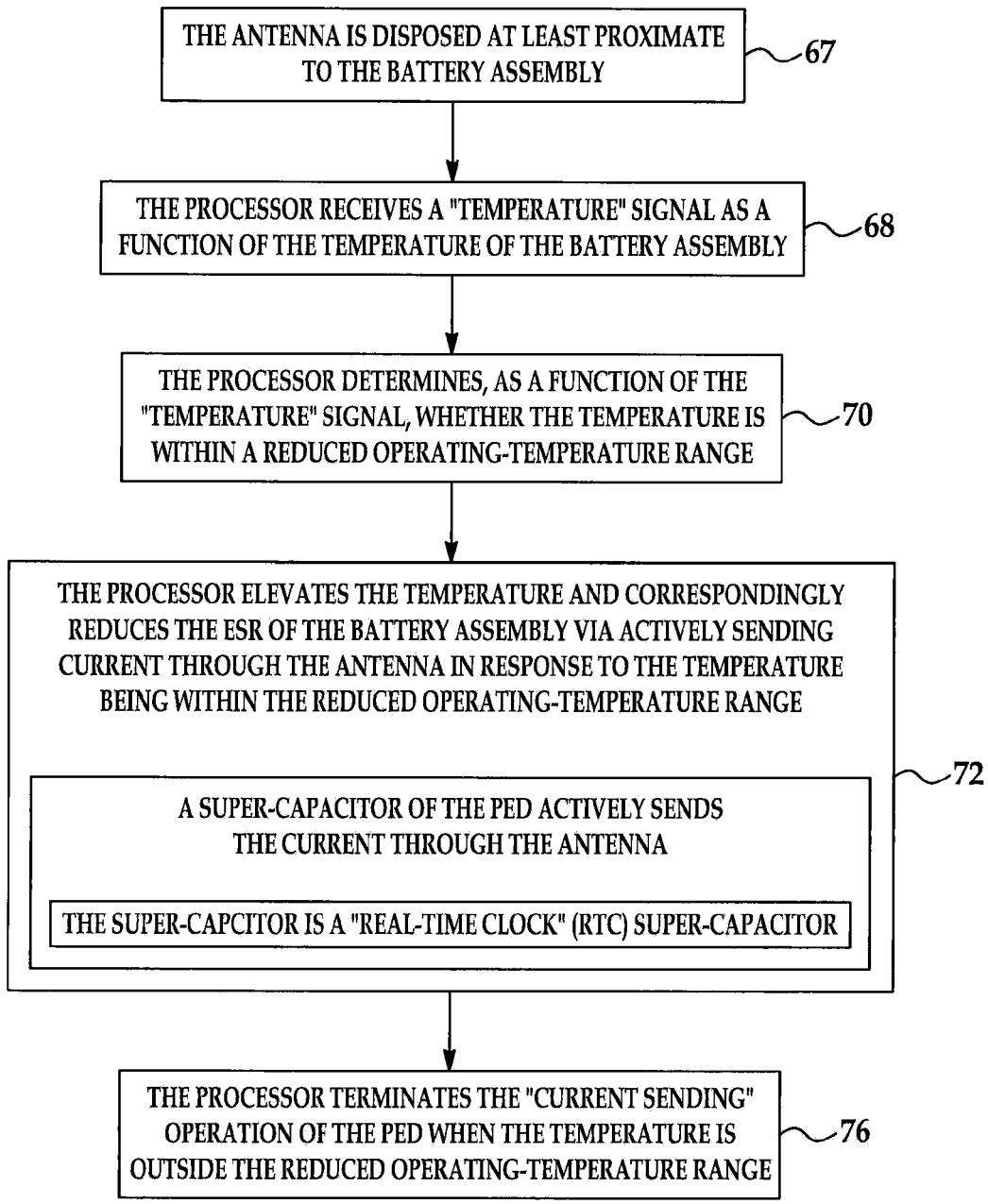
FIG. 5 is a flow diagram that illustrates a method of internally heating the power supply of the PED of FIG. 1 according to an embodiment.

In operation, referring to FIG. 5, an embodiment of the following method is executed while the battery assembly 16 is not being charged. Although described as being carried out by the processor 32, the embodiment may be carried out by a plurality of processors 32 in the PED 10. The embodiment includes, at step 67 and as discussed above, positioning the antenna 18 of the PED 10 proximate to the battery assembly 16. At step 68, the processor 32 receives a "temperature" signal as a function of the temperature of the battery assembly 16. At step 70, the processor 32, which executes the "temperature elevating and corresponding ESR reducing" application 64 and may control the power-management sub-system 58, determines, as a function of the "temperature" signal, whether the temperature is within a reduced operating-temperature range. At step 72, the processor 32 elevates the temperature and correspondingly reduces the ESR of the battery assembly 16 via actively sending current through the antenna 18 in response to the temperature being within the reduced operating-temperature range. In an embodiment, step 72 includes using a super-capacitor 74 of the PED 10 to actively send the current through the antenna 18. In particular, the super-capacitor 74 is a "real-time clock" (RTC) super-capacitor 74 (which is often used for memory backup as well). At step 76, the processor 32 terminates the "current sending" operation of the PED 10 when the temperature is outside the reduced operating-temperature range. The processor 32 may control the power-management sub-system 58 to terminate the "current sending" operation.

With the embodiment, the antenna 18 is being used substantially similarly to a resistor. In cold environments, the current that is actively sent through the antenna 18 helps to regulate the temperature of the battery assembly 16. If the temperature of the battery assembly 16 can be elevated sufficiently and the ESR of the battery assembly 16 can be correspondingly reduced, then a useful life of the battery assembly 16 can be resultantly extended such that a user of the PED 10 can make a phone call or e-mail or text a message from the PED 10 that he or she otherwise possibly would not have been able to make as a result of the PED 10 shutting down. This can be especially advantageous in an emergency situation. And, if the useful life of the battery assembly 16 can be extended, then the overall experience of the user can be improved.

The embodiment of FIG. 5 may be embodied as computer-readable instructions, such as instructions included in the "temperature elevating and corresponding ESR reducing" application 64. The "temperature elevating and corresponding ESR reducing" application 64 may be stored in the flash memory 44 or another computer-readable medium of the PED 10 and is executable by the processor 32. The "temperature elevating and corresponding ESR reducing" application 64 may control the power-management sub-system 58 to carry out the operations illustrated in FIG. 5.

In an environment in which the PED 10 is used is relatively cold (for instance, in geographical areas that experience relatively cold climates), the embodiments generally result in a useful life of the PED 10 that is longer than it would otherwise be. As a result, in an emergency situation, it may be possible to place a call or send an e-mail or text message using the PED 10 before it otherwise shuts down.

The embodiments lengthen the useful life of the PED 10 powered by the internal power supply 16. More specifically, the embodiments lengthen the useful life of the power supply 16 of the PED 10, especially in lower-temperature environments. The embodiments also create a secondary function of the antenna 18 for the purpose of elevating the temperature of the power supply 16.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated with another system, or certain features may be omitted or not implemented.

Also, techniques, systems, sub-systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating with each other through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of internally heating a power supply of a portable electronic device in reduced temperatures comprising:
   positioning an antenna of the portable electronic device proximate to the power supply;
   receiving a temperature signal from a temperature sensor coupled to the power supply, where the temperature signal is a function of a temperature of the power supply;
   determining whether the temperature is within a reduced operating-temperature range, wherein the reduced operating-temperature range is defined as a range of 0 degrees Celsius (° C.) to −18° C.;
   automatically sending a first amount of current through the antenna in response to the temperature being within the reduced operating-temperature range;
   automatically sending a second amount of current through the antenna in response to the temperature being lower that the reduced operating-temperature range
   and
   terminating the sending of current through the antenna in response to determining that a predetermined level of useful life of the power supply is reached.

2. The method of claim 1, wherein sending the first amount of current and the second amount of current through the antenna elevates the temperature and correspondingly reduces equivalent series resistance (ESR) of the power supply.

3. The method of claim 2, wherein elevating the temperature and correspondingly reducing the ESR of the power supply includes using a super-capacitor to actively send the current through the antenna.

4. The method of claim 1, including fixing the antenna to the power supply.

5. The method of claim 4, including providing the power supply with a door and the antenna being fixed to the door.

6. The method of claim 1, wherein the power supply is non-removable from the portable electronic device and including integrating the antenna with the power supply.

7. The method of claim 1, wherein the power supply is a battery of the portable electronic device.

8. The method of claim 1, wherein the antenna is near-field communication (NFC).

9. A portable electronic device comprising:
 a processor electrically coupled to a temperature sensor;
 a power supply electrically coupled to the processor and temperature sensor;
 an antenna positioned proximate to the power supply; and
 a power-management sub-system controlled by the processor, the processor configured to;
 receive a temperature signal from a temperature sensor coupled to the power supply, where the temperature signal is a function of a temperature of the power supply;
 determine whether the temperature is within a reduced operating-temperature range, wherein the reduced operating-temperature range is defined as a range of 0 degrees Celsius (° C.) to −18° C.; and
 control the power-management sub-system to automatically elevate the temperature and correspondingly reduce equivalent series resistance (ESR) of the power supply until a predetermined level of useful life of the power supply is reached by:
 transmitting a first amount of current through the antenna when the temperature is within the reduced operating-temperature range; and
 transmitting a second amount of current through the antenna when the temperature is less than the reduced operating-temperature range.

10. The portable electronic device of claim 9, wherein transmission of current to automatically elevate the temperature and correspondingly reducing the ESR of the power supply is terminated when the temperature is greater than the reduced operating-temperature range.

11. The portable electronic device of claim 9, wherein transmitting the first amount of current and the second amount of current through the antenna includes using a super-capacitor configured to actively send current through the antenna.

12. The portable electronic device of claim 9, wherein the antenna is fixed to the power supply.

13. The portable electronic device of claim 12, wherein the power supply includes a door and the antenna is fixed to the door.

14. The portable electronic device of claim 9, wherein the power supply is non-removable from the portable electronic device and the antenna is integrated with the power supply.

15. The portable electronic device of claim 9, wherein receiving the temperature signal includes receiving the temperature signal from the temperature sensor coupled to the power supply.

16. The portable electronic device of claim 9, wherein the power supply is a battery of the portable electronic device.

17. The portable electronic device of claim 9, wherein the portable electronic device is a mobile wireless communications device.

18. The portable electronic device of claim 9, wherein the antenna is configured for at least one of magnetic-field induction based wireless communications and frequency-modulation wireless communication.

19. A non-transitory computer-readable medium having computer-readable instructions stored on the computer-readable medium for execution of the computer-readable instructions by a processor to internally heat a reduced temperature power supply of a portable electronic device, the computer-readable instructions comprising:
 receiving a temperature signal from a temperature sensor coupled to the power supply, where the temperature signal is a function of a temperature of the power supply;
 determining whether the temperature is within a reduced operating-temperature range, wherein the reduced operating-temperature range is defined as a range of ° C. degrees Celsius (° C.) to −18° C.;
 automatically elevating the temperature and correspondingly reducing equivalent series resistance (ESR) of the power supply by,
 actively sending a first amount of current through an antenna in response to the temperature being within the reduced operating-temperature range; and
 actively sending a second amount of current through the antenna in response to the temperature being below the reduced operating-temperature range; and
 terminating the sending of either amount of current in response to determining that a predetermined level of useful life of the power supply is reached.

* * * * *